July 13, 1943.                L. J. HARRISS ET AL                2,323,907
                                  CRUST ROLLER
                       Filed Oct. 8, 1941        3 Sheets-Sheet 1
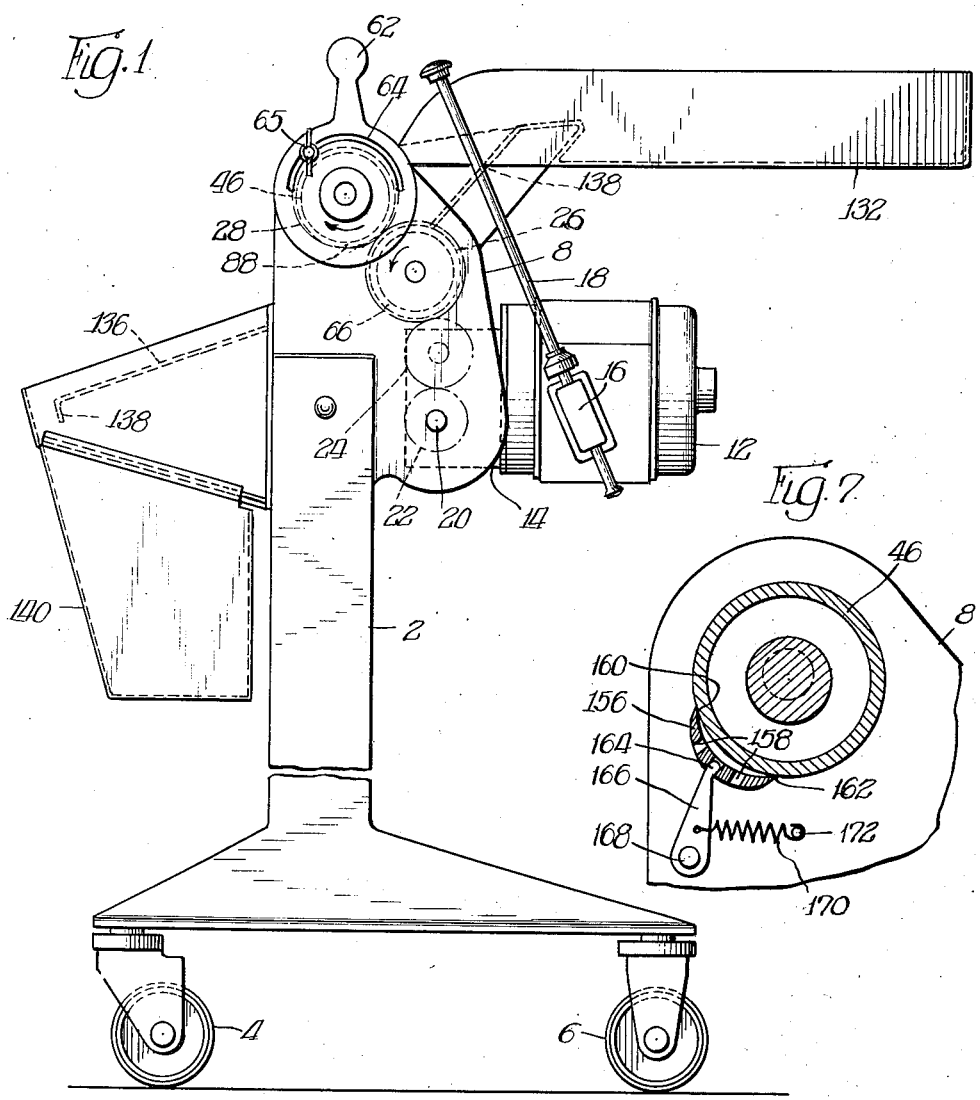
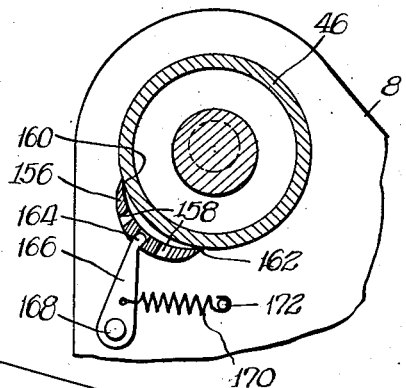
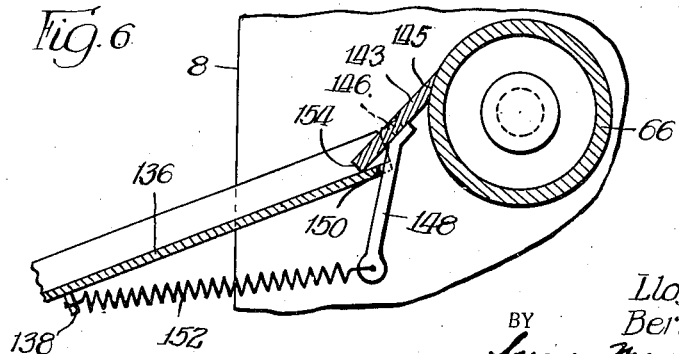
INVENTORS.
Lloyd J. Harriss,
Bernard Lambers July 13, 1943.    L. J. HARRISS ET AL    2,323,907
CRUST ROLLER
Filed Oct. 8, 1941    3 Sheets-Sheet 2
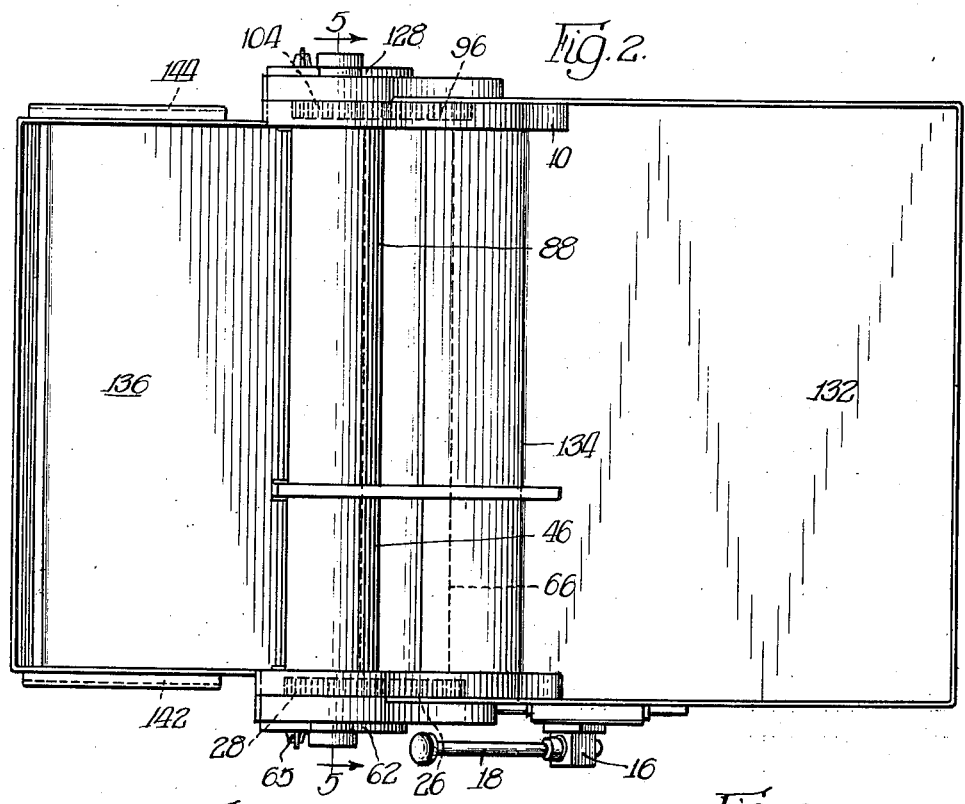
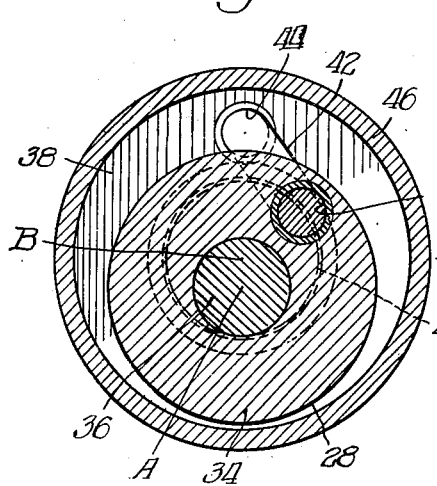
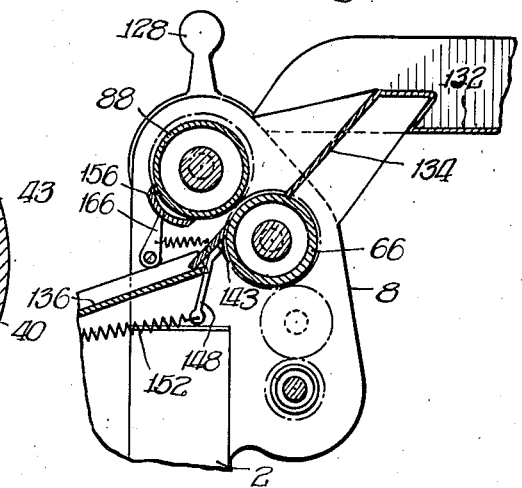
INVENTORS.
Lloyd J. Harriss,
Bernard Lambers,
BY
attys

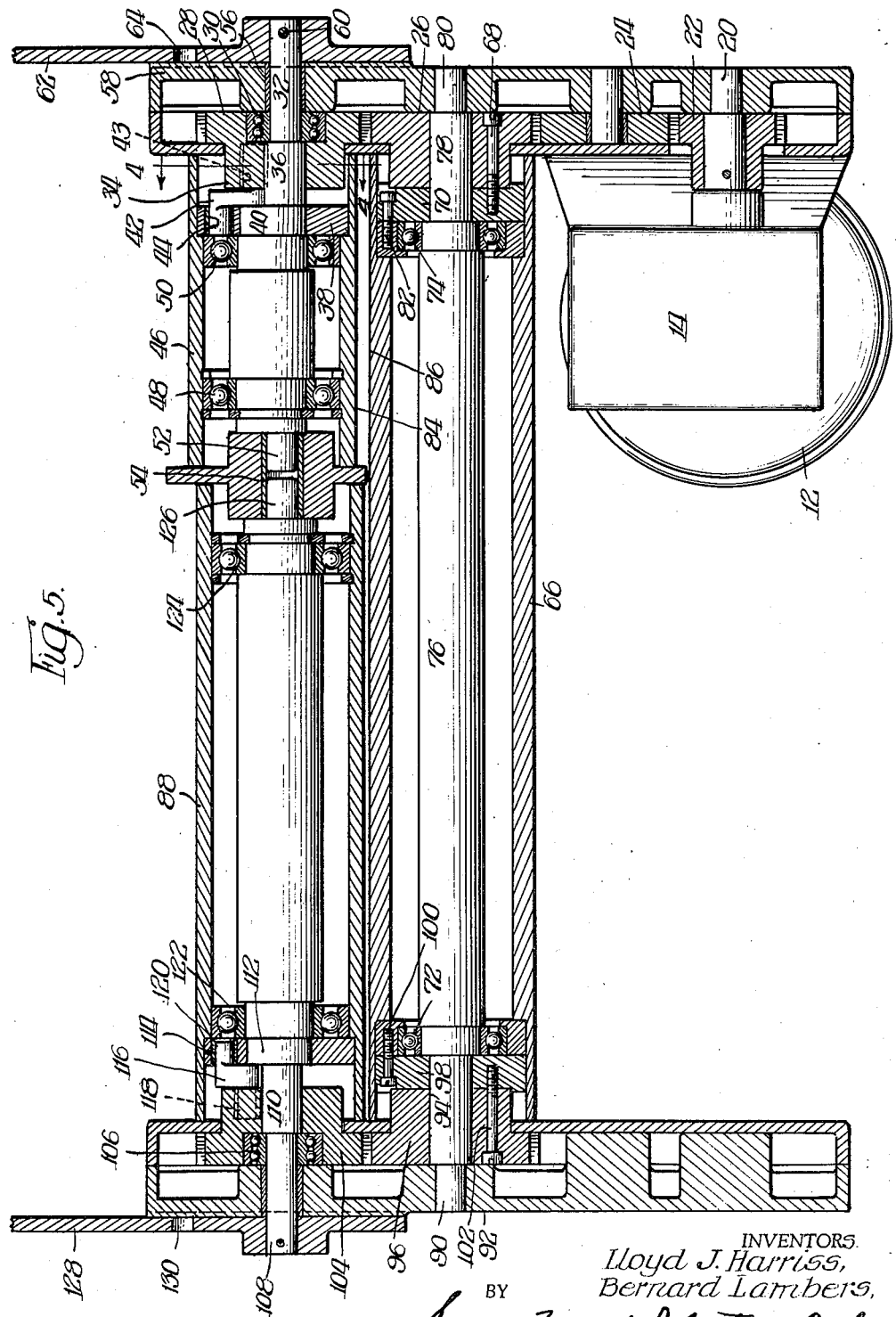

Patented July 13, 1943

2,323,907

UNITED STATES PATENT OFFICE 2,323,907

CRUST ROLLER

Lloyd J. Harriss, Kenilworth, and Bernard Lambers, Oak Park, Ill.; said Lambers assignor to said Harriss Application October 8, 1941, Serial No. 414,066

10 Claims. (Cl. 107—12)

This invention relates to apparatus for making sheets of plastic materials, and more particularly to an apparatus for making dough sheets or crusts such as, for example, pie crusts, or other pastry crusts.

One of the objects of the invention is to provide a new and improved type of gear driven crust roller in which the thickness of the crust or sheet may be controlled by a simple adjustment readily accessible to the operator.

Another object of the invention is to provide a new and improved type of apparatus for making plastic sheets such as, for example, pie crusts in which the sheet is positively formed in a multiple series of passes, each of which is positively controlled and adjustable as to the thickness of the sheet or crust being formed without the necessity for stopping the machine during the adjustment.

Another object of the invention is to provide a new and improved device for keeping the rollers free of dough or other plastic material during the operation thereof.

Still another object of the invention is to provide a device of the character described in which an adjustment of the dough rollers does not disturb the functioning of the means provided to keep the rollers free of adherent dough.

Still another object of the invention is to provide an apparatus of the character described having an accurately controlled means for removing the dough sheet or other plastic sheet from the rollers.

Other objects and advantages of the invention will be apparent by reference to the following description in conjunction with the accompanying drawings in which:

Figure 1 represents a side or end view of a new and improved type of crust roller provided in accordance with the invention;

Figure 2 represents a plan view of the apparatus shown in Figure 1;

Figure 3 is a detailed view of one portion of the apparatus shown in Figures 1 and 2;

Figure 4 is a detailed sectional view of a portion of the apparatus shown in Figures 1 and 2;

Figure 5 is a cross sectional view taken along the line 5—5 of Figure 2; and

Figures 6 and 7 show certain detailed views of the apparatus.

The crust roller generally shown in Figure 1 to illustrate the invention comprises a frame 2 mounted on four rollers, two of which rollers 4 and 6 are shown in Figure 1. Bonded to the upper part of the frame 2 or attached thereto by any other convenient method is a frame member 8. On the opposite side of the frame 2 is another upper frame member 10 as shown in Figure 2. Fastened between the two frame members 8 and 10 in any convenient and suitable manner is a motor 12 having a gear box 14 and a suitable push button starting switch 16 controlled by a long handle 18.

A shaft 20 from the gear box 14 is affixed to a gear 22 which meshes with an idler gear 24 and which in turn engages another gear 26 fixed to the lower crust roller 66. As long as the motor is in operation crust roller 66 is continuously driven through the train of gears 22, 24 and 26.

Referring now to Figure 5, it will be seen that the gear 26 engages with gear 28 mounted on ball bearings 30 freely rotatable on shaft 32. The hub 34 of gear 28 is freely mounted on an enlarged integral portion 36 of the shaft 32. A disc 38 is also freely mounted on an eccentric integral portion 40 of the shaft 32. The disc 38 is freely keyed to the hub 34 of the gear 28 by means of a crank 42, one end of which fits freely into the hole 44 in the disc 38 and the other end of which fits freely into the hole 43 in the hub 34 of the gear 28. The outer end of the disc 38 is fixed to a roller 46 for rolling the pie dough or other plastic material. The roller 46 is mounted and rotates upon ball bearings 48 and 50.

One end 52 of the shaft 32 is freely supported by a bearing 54. The other end is supported by a bearing 56 which is part of a frame plate 58. A portion of the shaft 32 projects through the bearing 56 in the manner shown in Figure 5 and is keyed by means of a keying element 60 to a lever or arm 62. The lever or arm 62 is provided with an arcuate slot or aperture 64, as better shown in Figure 1, through which a set screw 65 may be disposed whereby when said set screw is tightened against the frame member 58 the position of the lever or arm 62 will be fixed.

The gear 26 is keyed to the lower roller 66 in any suitable manner, for example, as shown in Figure 5, by means of the keying element 68 engaging with the end 70 of the roller 66. As shown in Figure 5 the roller 66 preferably rotates on a pair of bearings 72 and 74 around the fixed shaft 76. It will be understood that the gear 26 is freely mounted on the portion 78 of the fixed shaft 76. The end 80 of the fixed shaft 76 is carried by one part of the frame member 58. It will also be understood that the end 70 of the roller 66 is freely mounted on the portion 78 of the shaft 76 and is keyed to the remainder of the roller by a keying element 82.

As will be apparent by reference to Figure 5, any roation of the lever 62 will be imparted to the shaft 32 due to the fact that the lever 62 is keyed to the shaft 32 by means of the keying element 60. This will cause all portions of the shaft 32, including the enlarged integral portion 36 and the eccentric portion 40, to rotate. The position of the gear 28 is fixed and is not changed by any rotation of the shaft 32 but the position of the disc 38 is changed by the rotation of the shaft 32 due to the presence of the eccentric 40. This change in position of the disc 38 causes a corresponding change in the position of the upper roller 46 so that the surface 84 thereof tends to become closer to or farther away from the surface 86 of the lower roller 66, as shown in Figure 5. Although the disc 38 through which the roller 46 is driven is moved with respect to the driving member 28, such movement is compensated for by the fact that the keying element 42 is freely mounted in the holes 42 and 44 of the driving member 28 and the disc 38, respectively. The principle of operation is probably best illustrated by reference to Figure 4, a sectional view taken along the line 4—4 of Figure 5, in which A represents the axis of rotation of shaft 36 and also of the hub 34 of gear 28, and B represents the axis of rotation of the roll 46. When the shaft 36 is turned the axis A remains fixed but the axis B moves with respect to the axis A. Thus, the roll 46 is moved toward or away from the roll 66 without disturbing the driving relationship between gear 28 and gear 26 (Figure 5).

In the particular illustration of the invention here shown a pair of adjustable upper rollers 46 and 88 is employed in conjunction with a single large lower roller at 66. The provision of more than one upper roller is particularly advantageous because in this way it is possible to make multiple passes of the material which is to be rolled without transferring it to another machine. This is accomplished, for example, by setting the relatively narrow roller 46 so that there is a substantial space between the surface 84 thereof and the surface 86 of the lower roller 66, then passing a mass or billet of the plastic material, for example, dough, between the roller 46 and the roller 66 to obtain a sheet of material which has a thickness substantially greater than the desired thickness and thereafter passing said sheet between the relatively wider roller 88 and the lower roller 66 with a somewhat finer adjustment of the distance between these rollers.

The adjustment of the wider upper roller 88 is accomplished in the same general manner as described with reference to the narrower roller 46 as follows. The opposite end 90 of the central shaft 76 of the roller 66 is disposed in a frame member 92. A portion 94 of the shaft 76 carries a gear 96 which is freely mounted thereon and also a disc 98 which is freely mounted thereon and which is keyed by means of a keying element 100 to the roller 66. The disc 98 in turn is keyed by means of a keying element 102 to the gear 96 whereby the rotation of the roller 66 is transmitted to the gear 96. The gear 96 engages with a gear 104 mounted on roller bearings 106 and freely rotatable on shaft 108. The shaft 108 is similar in every respect to the shaft 32 except that it is somewhat longer. The enlarged portion 110 corresponds to the enlarged portion 36 of shaft 32. The eccentric portion 112 corresponds to the eccentric portion 40 of the shaft 32. The disc 114 corresponds to the disc 38. The crank element 116 corresponds to the crank element 42 and the apertures 118 and 120 correspond respectively to the apertures 42 and 44. The bearings 122 and 124 are similar and are similarly mounted to the bearings 48 and 50. The end 126 of the shaft 108 is mounted in one end of the bearing or bushing 54, as shown in Figure 5. The control lever 128 corresponds to control lever 62 and has an aperture 130 similar to the aperture 64 in which may be disposed a suitable set screw or other locking means similar to the set screw 66. The operation of the roller 88 is therefore generally similar to the operation of the roller 46 but as previously indicated, in practice it is customary to adjust the roller 46 so that there is a substantially greater clearance between the roller 46 and the lower roller 66 than between the roller 88 and the lower roller 66.

Prior to passing the material through the rollers it is placed in a tray 132 or similar suitable receptacle which is coextensive with both of the rollers 46 and 88, as shown in Figure 2. A chute or hopper 134 is provided in order to facilitate the introduction of the plastic material to the rollers. The upper rollers 46 and 88 rotate in a clockwise direction and the lower roller 66 rotates in a counter-clockwise direction. On the exit side of the rollers an inclined passage 136 is provided in order to facilitate the removal of the plastic sheet. The end 138 of the passageway 136 is preferably bent or curved in the manner shown in Figure 1 and extends over a hopper or receptacle 140 which slides over a pair of guideways 142 and 144, as shown in Figure 2, and which is readily removable merely by pulling it outwardly. The hopper 140 permits any scraps of material to be readily removed and used over again. The dough sheet or other plastic sheet may readily be grasped by allowing the ends thereof to extend over the curved or bent end 138. The dough sheet may be transferred to a pie pan or other suitable receptacle in any convenient manner.

One feature of the invention is the provision of a substantially rigid scraper member 143 adapted to fit relatively closely against the lower roller 66 and also capable of being readily removed for cleaning. The scraper member 143 is preferably made of metal and is provided with an upper edge 145 cut or shaped to fit against the roller 66. Affixed centrally to the scraper member 143 by means of rivets, or other suitable means 146 is a pair of arms 148, one on either side of the scraper which rest against the upper end 150 of the exit passageway 136. The lower ends of the arms 148 are each fixed to a pair of coil springs 152. The resilience of the springs 152 causes the arms 148 to be pulled against the upper end 150 of the exit passageway 136 and at the same time causes the scraper member 143 to be pulled downwardly against the roller 66 so that one end 145 touches or substantially touches the roll 66 and the other end 154 presses against the top of the exit passageway 136. This feature of the invention is shown in detail in Figure 6.

Another feature of the invention is the provision of a new and improved type of scraper member 156 for the upper rollers. The scraper member 156 comprises a curved rigid member preferably made of metal and having holes 158 therein. The ends 160 and 162 of the member 156 are relatively sharp and the curvature of the member 156 is such that said ends will substantially touch the rollers 46 and 88 as the case may be. It will be understood that a separate scraper similar to 156 is provided for each of said rollers. Scraper 156 is preferably pivoted by means of any suitable type of pivot 164 mounted on the end of a member 166 which is preferably rigid, although it may be flexible. The member 166 is pivoted at point 168 and associated with a coil spring member 170, one end of which 172 is fastened to the upper frame member 8 thereby causing the member 166 to resiliently urge the scraper 156 against either of the rollers 46 or 88 as the case may be. The important feature of this part of the invention is that by constructing the scraper in this manner it follows the contour of the upper rollers when the latter are moved toward or away from the lower roller in the manner previously described. On the other hand, if the scraper element 156 were merely a resilient spring metal member, as is customary, the movement of the upper rollers would cause the scraper to assume a different position with different positions of the rollers with the result that it might operate correctly in some positions but not in others. This feature of the invention is shown in detail in Figure 7.

The invention is particularly advantageous in that it provides a positive gear drive for all of the rollers while at the same time permitting the distance or space between the upper and lower rollers to be adjusted without stopping the machine. The invention also provides an apparatus of the character described having multiple rollers capable of different settings or adjustments while the machine is in operation. Furthermore, as already indicated, the adjustment of the space between the rollers does not require additional adjustments of other parts of the apparatus such as the scraper members.

Having thus described the invention, what we claim as new and desire to secure by Letters Patent of the United States is:

1. A mechanism of the type described comprising a driving member and a driven member eccentrically mounted with respect to each other, means operatively associated therewith for moving the driven member around the axis of the driving member while keeping the driving member in the same position, and means operatively associated with both members for maintaining the driving relationship between them while said driven member is being moved around the axis of the driving member.

2. A mechanism of the type described comprising a driving member and a driven member eccentrically mounted with respect to each other on a common shaft, means operatively associated with said shaft for moving the driven member around the axis of the driving member while keeping the driving member in the same position, and means comprising a keying member freely associated with said driving member and said driven member thereby a maintain a fixed driving relationship between the two members when the one is being moved with respect to the axis of rotation of the other.

3. A mechanism of the type described comprising a driving member and a driven member freely mounted on a common shaft with their axes of rotation eccentrically disposed with respect to one another, a keying member freely mounted between said driving member and said driven member, and means operatively associated with said shaft for moving said shaft about the axis of the driving member thereby causing the driven member to move with respect to the axis of the driving member while said keying member maintains the same driving relationship between the driving member and the driven member.

4. A device for rotating a movable member and for adjusting the position of said movable member while positively driving it which comprises a shaft having two circular bearing surfaces eccentrically disposed with respect to one another, a driving member freely mounted on one of said bearing surfaces, a driven member freely mounted on the other of said bearing surfaces, a keying member between said driving member and said driven member freely mounted with respect to each of them and means for independently rotating said shaft whereby said driven member is moved to a new position while it is being driven by said driving member.

5. A device for driving a movable roll and for adjusting the distance between said movable roll and another working surface while positively driving said roll which comprises a shaft having two circular bearing surfaces eccentrically disposed with respect to each other, a driving member freely mounted on one of said bearing surfaces, a roll freely mounted on the other of said bearing surfaces, a keying member between said roll and said driving member freely mounted with respect to each of them, and means for independently rotating said shaft whereby the distance between said roll and said working surface is adjusted while the roll is being positively driven by said driving member.

6. A device for driving a movable roll and for adjusting the distance between said movable roll and another working surface while positively driving said roll which comprises a shaft having two circular adjacent bearing surfaces eccentrically disposed with respect to each other, one of said bearing surfaces being smaller than the other and being disposed toward one end of the shaft with its outer periphery substantially tangential with the outer periphery of the larger bearing surface, a driving member freely mounted on the smaller of said bearing surfaces, a driven member fixed to a roll freely mounted on the larger of said bearing surfaces, a keying member between said driven member and said driving member freely mounted with respect to each of them, and means for independently rotating said shaft whereby the position of said roll is adjusted while it is being positively driven.

7. In an apparatus of the character described for rolling plastic materials into sheets, a wide non-adjustable roll continuously driven through a train of gears, a pair of adjustable rolls each of less width than said wide roll and having a total width substantially equal to the width of said wide roll, a pair of end to end shafts on each of which is mounted one of said adjustable rolls, each of said shafts having a circular portion about which is freely mounted a gear engaging with said train of gears and each of said shafts having another circular portion eccentric with respect to the axis of said circular portion around which said gear is mounted, each of said rolls being freely rotatable around said second circular portion of said shaft, said rolls being keyed to said gears by keying elements mounted freely between each of said gears and its respective roll, and means for independently rotating each of the shafts around which said adjustable rolls are mounted whereby each of said adjustable rolls may be adjusted in a predetermined spaced relationship with said non-adjustable roll by rotating said shaft while said rolls are being driven.

8. In an apparatus of the character described having a non-adjustable roll and another roll adjustable with respect to the spaced relationship between said rolls, a scraper member having a generally arcuate configuration and being of substantial width to extend along said adjustable roll with the opposite ends of the arc in scraping relationship therewith, a support member mounted freely at the back of and pivotally secured to said scraper member and resilient means urging said scraper member against said adjustable roll whereby when the position of said adjustable roll is changed said scraper member automatically moves to said changed position while maintaining substantially the same relationship with respect to said roll.

9. In an apparatus of the character described having a rotating roll associated with a discharge chute, a scraper member comprising a substantially rigid scraper blade substantially coextensive with said roll and said chute resting freely and obliquely between said chute and said roll, a supporting member fixedly mounted at one end to the back of said scraper member, resilient means attached to the other end of said supporting member and normally tending to urge said supporting member in a direction toward said chute, and an intermediate part of said supporting member being disposed against the end of said chute between the end of said chute and said roll whereby the action of said resilient means causes said supporting member to be pressed against the end of said chute thereby in turn causing said scraper member to be resiliently pressed against said roll and said chute.

10. In an apparatus of the character described for rolling plastic materials into sheets, a non-adjustable roll, a pair of adjustable rolls each of less width than the first roll, a pair of end to end shafts on each of which is mounted one of said adjustable rolls, each of said shafts having a circular portion about which is freely mounted a gear and each of said shafts having another circular portion eccentric with respect to the axis of said circular portion around which said gear is mounted, each of said pair of rolls being freely rotatable around said second circular portion of said shafts, said rolls being keyed to said gears by keying elements mounted freely between each of said gears and its respective roll, and means for independently rotating each of the shafts around which said adjustable rolls are mounted whereby each of said adjustable rolls may be adjusted in a predetermined spaced relationship with said non-adjustable roll by rotating said shaft while said rolls are being driven.

LLOYD J. HARRISS.
BERNARD LAMBERS.